| United States Patent [19] | [11] Patent Number: 4,946,529 |
| Huddleston | [45] Date of Patent: Aug. 7, 1990 |

[54] CROSSLINKED ADHESIVE SYSTEM

[75] Inventor: Elwyn G. Huddleston, Franklin, Ky.

[73] Assignee: The Kendall Company, Boston, Mass.

[21] Appl. No.: 823,222

[22] Filed: Jan. 28, 1986

[51] Int. Cl.$^5$ ............................................. B65H 81/00
[52] U.S. Cl. ................................. 156/187; 138/144; 138/DIG. 1; 138/DIG. 6; 156/192; 156/195; 156/310; 242/7.02; 242/7.23; 428/420; 525/236; 525/237
[58] Field of Search ................ 428/420; 525/236, 237; 242/7.02, 7.23; 138/144, DIG. 1, DIG. 6; 156/310, 192, 195, 187

[56] References Cited

U.S. PATENT DOCUMENTS

| 2,458,843 | 1/1949 | Fischer | 525/237 |
| 2,739,141 | 3/1956 | Ernst et al. | 525/237 |
| 3,063,891 | 11/1962 | Boylan et al. | 156/310 |
| 3,284,262 | 11/1966 | Fowling | 156/310 |
| 3,697,353 | 10/1972 | Brochu et al. | 156/310 |
| 4,472,231 | 9/1984 | Jenkins | 156/187 |

*Primary Examiner*—John J. Gallagher
*Attorney, Agent, or Firm*—Alvin Isaacs

[57] ABSTRACT

Novel system for providing anti-corrosion protective coatings, e.g. for metal pipes and the like, comprising: (1) a rubber-based primer coating mixture; and (2) an adhesive tape comprising a backing carrying a rubber-based adhesive coating comprising a mixture of pre-crosslinked butyl rubber and virgin butyl rubber alone or in combination with reclaimed butyl rubber, the system further including a crosslinking agent and a crosslinking activator adapted to provide an incipient or in situ crosslinking of the system after the primer coating and tape are applied.

Preferably, the crosslinking agent is contained initially in the adhesive coating; and the activator is contained initially in the primer.

23 Claims, No Drawings

CROSSLINKED ADHESIVE SYSTEM

BACKGROUND OF THE INVENTION

The present invention relates to anti-corrosion protective coatings for metal surfaces, e.g. metal pipes that are destined for inground implantation, and more particularly, to certain improvements over the invention described and claimed in U.S. Pat. No. 4,472,231 issued Sept. 18, 1984 to Robert F. Jenkins and assigned to The Kendall Company, the assignee of the instant application.

It has previously been the practice to provide anti-corrosion protective pipe coatings by supplying, in roll form, preformed polyolefin tapes having one surface that is coated with a butyl-based adhesive comprising a mixture of both virgin butyl rubber and reclaimed butyl rubber.

U.S. Pat. No. 4,268,334 issued to George M. Harris and Samuel J. Thomas discloses a method for increasing the strength of the adhesive bond in a layer comprising a blend of virgin butyl rubber and reclaimed butyl rubber comprising the step of incorporating in the butyl adhesive layer specified amounts of a p-dinitrosobenzene or p-quinone dioxime crosslinking agent and an activator such as lead oxide. As is stated in Col. 1, lines 26 et seq., the amount of crosslinking agent employed is in excess of a threshold value. However, it is stated at Col. 1, lines 24–26 that the amount of crosslinking agent has no appreciable effect upon bond strength of the tape after it has been applied to the pipe. Accordingly, no additional crosslinking of the rubber in the underlying primer or the primer-adhesive interface regions would occur subsequent to the application of the adhesive tape to the pipe itself.

The aforementioned U.S. Pat. No. 4,472,231 of Jenkins is directed primarily to providing an improved anti-corrosion protective coating for the surface of metal pipes that are designed for inground implantation, e.g. an improvement over procedures such as are disclosed in the aforementioned U.S. Pat. No. 4,268,334 of Harris et al.

As explained in the Jenkins patent, anti-corrosion protective coatings that are applied to inground pipeline structures are often subjected to rather severe long-term shearing forces derived from the surrounding soil. The magnitude of these shearing forces depends upon several factors, including amongst others: (a) the type of the soil, (b) the tectonic forces surrounding the implanted pipeline, (c) the size of the pipe, (d) the axial site emplacement and (e) the range of thermal expansion of the pipe as well as its contents.

In order to understand how each of the above factors affect the overall shear stress imparted to an inground pipeline coating, we first shall consider the forces acting upon implanted pipelines.

Frictional forces acting between the pipeline anti-corrosion protective coating and the surrounding soil are the primary source of shear stress. Frictional forces are here defined as the product of the frictional coefficient between the pipeline coating and the soil and the normal force acting around the pipe. As the coefficient of friction depends upon both the nature of the pipeline coating as well as the surrounding soil, it will be found to vary in different applications. Olefin polymer pipeline protective coatings, such as polyethylene, or the like, inherently exhibit lower coefficients of friction, as the protective tape outer surfaces are smooth and substantially non-adherent.

Other factors having importance in these considerations are the weight of the soil above the pipe, as well as the weight of the pipe, including its contents. In addition, since the normal force will vary depending on the axial position around the pipe diameter, the frictional force and hence the shearing force, will also be found to vary around the diameter of the pipe.

The result of long-term shear forces on a pipeline protective coating is referred to as "soil stress." Soil stress on anti-corrosion protective coatings generally results from the structural shear forces which cause the protective coating to creep along the pipeline peripheral surface.

Creep is, in essence, a long term visco-elastic, or "cold-flow" phenomenon, common to all polymeric substances. The amount of creep, however, will depend upon the physical properties of a coating. Since the physical properties (i.e. modulus) of a coating, will be temperature dependent, temperature becomes a decisive element in determining the amount of creep. At low temperatures, the propensity of the protective coating to creep will be substantially reduced, while at elevated temperatures, the likelihood of creep will be significantly increased, other factors remaining the same.

However, adhesive resistance to flow or creep, may be improved by introducing crosslinks between the component rubber chains.

When a rubber-based, or the like, adhesive system is crosslinked, (1) its resistance to creep is increased, (2) the overall dimensional stability is improved, and (3) it is more resistant to heat distortion. In addition, the above-listed crosslinking effects are generally intensified as the crosslink density is increased, and can therefore be controlled by adjusting the number of crosslinks in an adhesive coating. Crosslinking provides numerous anchoring points for the individual rubber chains, and these anchor points restrict excessive movement within the rubber of the adhesive, thereby resulting in limited creep or flow of the polyolefin tape coating.

As further stated in the Jenkins patent, a typical conventional pipewrap anti-corrosion protective system may comprise a primer that is applied to the pipeline outer surface, and an anti-corrosion protective adhesive tape overlaying the primer coating. The primer in the conventional pipewrap anti-corrosion system is typically a mixture of rubber and resins, which may be applied to the pipeline outer surface, by means of spraying, brushing, dipping or rugging. The adhesive tape is generally composed of a polyolefin backing material, such as polyethylene, or the like, with a rubber-based adhesive that is coated onto a surface of the polyolefin backing material. In the conventional pipewrap anti-corrosion protective system there is no crosslinking agent present in either the primer or the adhesive tape components.

According to the teachings of Jenkins, improved anti-corrosion protective coatings may be provided for metal pipes that are to be subjected to a high shear stress inground environment by what the patentee terms a two component interacting pipewrap anti-corrosion protection system consisting of: (1) a primer mixture comprising a blend of natural rubbers, resins and a crosslinking metal oxide activator coated with organo-titanate; and (2) a rubber-based adhesive carried on an olefin polymer backing to be helically wrapped over the primer layer, the adhesive layer comprising blend of virgin butyl rubber and reclaimed butyl rubber partially crosslinked with p-quinone dioxime crosslinking agent, a tackifier, and a residual amount of the p-quinone dioxime crosslinker.

The organo-titanate surface treated metal oxide, preferably lead dioxide, serves primarily as a crosslinking catalyst to increase both the speed and yield of the crosslinking reaction effected by the p-quinone dioxime crosslinking agent. As is explained at the top of Col. 3 of the Jenkins patent, if the lead dioxide is not surface-treated with the organo-titante coupling agent, the crosslinking reaction will take place at a considerably slower rate, thereby severely limiting the usefulness of the metal oxide as a crosslinking catalyst.

Initial partial crosslinking in the described two component interacting pipewrap system occurs only in the adhesive component layer. However, as the adhesive layer, containing residual, unreacted p-quinone dioxime crosslinker, is placed in contact with the primer-coated pipe outer surface, a further crosslinking reaction then occurs at the primer-adhesive interface, as well as throughout the primer layer and the adhesive layer. This additional crosslinking, which is aided in part by the elevated temperature of the operating pipeline and its contents, results in an improved ability of the system to resist tape creep caused by high shear forces.

As is stated in Col. 3, the crosslinking reaction results in increasing the cohesive strength, and consequently in shear resistance, of both the adhesive and primer layers. The primer-adhesive interface zone of crosslinking following application of the adhesive-coated tape to the primer-coated pipe surface results in an inter-crosslinked adhesive/primer system. An important feature is the crosslinking at the adhesive/primer interface which serves to increase markedly the adhesion of the helically wrapped tape to the primer-coated pipe, thereby reducing significantly the creep caused by high shear stress forces in situ. Further, the increase in the speed and extent of the crosslinking reaction rate results in the above-described improved anti-creep characteristics in the presence of soil shear forces.

It will be noted that the two-component system of Jenkins relies upon what the patentee describes in essence as a high speed additional crosslinking obtained by employing p-quinone dioxime as crosslinker and metal oxide, preferably lead dioxide, activator surface-treated with organo-titante. The increased speed obtained thereby was thought to be critical to the solution of the task of the invention.

While the patented system was entirely satisfactory in small-scale manufacture of an anti-corrosion pipewrap system, it nevertheless suffered from certain deficiencies making it impractical in the larger scale commercial manufacture of the system.

Specifically, it has been found that the operating conditions taught in U.S. Pat. No. 4,472,231 do not provide a procedure which is processable in a Banbury mixer in commercial production of the adhesive. Repeated attempts to implement the teachings of the '231 patent on production equipment immediately resulted in lumpy adhesive.

The present invention is directed to the solution to this problem, i.e. to adapt the teachings of '231 to a commercially feasible continuous production run to provide a pipewrap meeting the desired shear requirements, e.g. after 48 hours conditioning at 85° C., the shear rate will not exceed $10^{-8}$ meters/second.

In order to solve this lumping problem, it was first necessary to ascertain the cause of the problem. Accordingly, the present invention is in part predicated upon the recognition and clear understanding of the cause and nature of the problem; and it is in part predicated upon the discovery of a means for obviating the problem.

BRIEF DESCRIPTION OF THE INVENTION

As mentioned above, the present invention is in part predicated upon the discovery of the cause of the problem. It has been discovered that this lumping is caused by the particular crosslinking agent, p-quinone dioxime, employed in the patented process. Specifically, it has been discovered that this crosslinking agent reacts so quickly under Banbury processing conditions that there is not sufficient time for proper dispersion to avoid lumping. Thus, while the patent teaches the use of a fast-acting crosslinking agent to increase both the speed and yield of crosslinked rubber, from the standpoint of commercial production this is not possible.

According to this invention, the problem is solved in a highly efficacious manner by employing a pre-crosslinked butyl in lieu of crosslinking in the Banbury and adding the requisite amount of crosslinking agent to effect the crosslinking in situ in the ground at some time after this initial mixing in the Banbury, e.g. prior to coating the adhesive on the backing material. The rubber-based composition of this invention will accordingly comprise a mixture of pre-crosslinked butyl rubber and virgin rubber alone or in combination with reclaimed rubber.

DETAILED DESCRIPTION OF THE INVENTION

The present invention is directed to providing an anti-corrosion protective coating for the surface of tubular articles such as metal pipes and the like that are to be subjected to a high shear stress environment, which coating can be described as consisting essentially of a rubber-based primer mixture applied to the surface of the pipe and an outer, preferably helically wrapped, rubber-based adhesive tape which is partially crosslinked, the protective coating further being characterized in that additional crosslinking will occur at the primer-adhesive layer interface, as well as throughout the rest of the primer adhesive layers following overlaying of the primer surface with the adhesive tape.

This additional crosslinking has been found to provide superior resistance to creep caused by high shear forces by increasing the cohesive strength and consequently the shear resistance of both the adhesive and primer layers.

The method for providing such an anti-corrosion coating is described and claimed in U.S. Pat. No. 4,472,231 issued to Robert F. Jenkins and assigned to The Kendall Company, the assignee of the instant application. According to this patent, the coating comprises (1) a primer mixture comprising a blend of natural rubber, resins and a metal oxide crosslinking activator; and (2) an adhesive-coated tape comprising an olefin polymer backing material having a rubber-based adhesive coated on one surface thereof, the adhesive coating being a blend of virgin butyl rubber and reclaimed butyl rubber and a tackifier, the rubber being partially crosslinked in manufacture of the adhesive mixture by incorporating p-quinone dioxime crosslinking agent, a residual (or excess) amount of the p-quinone dioxime crosslinker being present in the adhesive coating.

As is described in the patent, when the adhesive tape containing residual unreacted p-quinone dioxime crosslinking agent in its adhesive coating is placed into contact with the primer-coated pipe outer surface, a further crosslinking reaction then occurs at the primer-adhesive interface zone, as well as throughout the primer layer and the adhesive layer. This additional crosslinking is aided in part by the elevated temperature of the operating pipeline and its contents. The Jenkins patent anti-corrosion protective coatings that are applied to inground pipeline structures are often subjected to long-term shearing forces derived from the surrounding soil. The magnitude of these shearing forces depends upon several factors, including amongst others (a) the type of soil, (b) the tectonic forces surrounding the implanted pipeline, (c) the size of the pipe, (d) the axial site emplacement, and (e) the range of thermal expansion of the pipe as well as its contents.

While the general concept described in this patent, namely the two-stage crosslinking wherein the latter stage occurs in situ on the inground wrapped pipe, provides an elegant pipewrap system accomplishing all of the objectives of the patentee in terms of stability, resistance to shear and creep, etc., it has not been found possible, following the patented procedures, to manufacture the adhesive tape on the production equipment needed for large scale commercial manufacture. Repeated attempts to do so always resulted in a lumpy adhesive mixture which was totally unsatisfactory.

The primary task of the present invention, accordingly, is to modify the teachings of the '231 patent in order to provide production runs of the adhesive tape which can then be employed in the inground crosslinking system described in the patent. In this context, the present invention can be said to be directed to an improvement over the teachings of '231 to permit commercial utilization of the general concept of the patent.

As mentioned earlier, the solution to this task is in part predicated upon the recognition of the cause of this lumping and is in part predicated upon providing a way to obviate the lumping problem so as to provide, in a commercial manufacturing system, the required homogeneous dispersion of adhesive composition to be applied to the backing material to provide the adhesive tape.

It has now been ascertained that the cause of the problem is the particular crosslinker, p-quinone dioxime. While the patent suggests (Col. 3) that the initial crosslinking should occur rapidly, in point of fact it has been discovered that p-quinone dioxime will react so quickly under Banbury manufacturing conditions that there is not sufficient time for proper (homogeneous) dispersion. Accordingly, an alternative approach must be found for this initial crosslinking.

In accordance with the present invention, no crosslinking occurs in the Banbury. Instead, the initial crosslinking required to provide an adhesive tape is obtained by employing a partially pre-crosslinked butyl in the Banbury mix. In other words, the rubber components to be admixed with the tackifier and other ingredients in the Banbury to form a substantially homogeneous dispersion (hereinafter referred to as the "premix") will consist of a partially pre-crosslinked virgin butyl and a [non-crosslinked] virgin butyl rubber. Optionally, a portion of the virgin butyl may be, and preferably will be replaced with reclaimed butyl rubber, in which event the premix will contain a blend of partially crosslinked virgin butyl, non-crosslinked virgin butyl and reclaimed butyl rubber. The resulting premix will be effectively free of any crosslinking agent. [It is possible that the pre-crosslinked and/or reclaimed rubber may possibly contain inconsequential trace amounts of unreacted crosslinker.]

Partially crosslinked butyls are commercially available and per se comprise no part of this invention. By way of illustration, mention may be made of "Kalar", trademark of Hardman, Inc. for a virgin butyl rubber partially crosslinked to a thermoplastic rubber and then pelletized. Kalar is available in four grades, 5214, 5245, 5263 and 5264, having viscosities (Mooney ML 1+3 @ 127° C.) of 50–60, 30–40, 58–68 and 55–65, respectively; and specific gravities @25° C. (ASTM D 471-68 Sec. 8.14) of 1.02, 1.02, 0.92 and 1.07, respectively. Other commercially available partially crosslinked butyls will also be readily suggested to the skilled worker, as would procedures for partially vulcanizing in house.

In general, the degree of partial crosslinking of the butyl rubber prior to mixing with the other components in the Banbury to form the premix dispersion may vary within a wide range to prove a coatable rubber-based adhesive formulation. It may, for example, be on the order of 35 to 75%.

In general, the proportions of partially crosslinked rubber in the total rubber blend will vary inversely to the percentage of crosslinking, i.e. the greater the percentage of crosslinking within the above-noted 35–75% range, the lesser amount of pre-crosslinked rubber is required in the premix. While the determination of the precise amounts which may be desired for optimum results will be within the expected judgment of the skilled worker in the light of this description, in general it may be said that the amount of partially crosslinked rubber to be employed in the premix will be on the order of from about 8 to about 48%, depending upon the degree of crosslinking, the remainder being virgin butyl or a mixture of virgin butyl and reclaimed rubber.

By way of further illustration, when employing a 55% pre-crosslinked butyl, it has been found that the amount of this pre-crosslinked butyl should be on the order of from about 13 to about 30% by weight of the total rubber blend. In other words, the rubber blend in the premix should comprise from about 13 to about 30% by weight partially crosslinked butyl rubber, the remainder being virgin butyl alone or in combination with reclaimed rubber.

In addition to this rubber blend, the premix will include a tackifier as well as the other components performing specific desired functions heretofore employed in rubber-based adhesive formulations for pipewraps and the like, e.g. antioxidants, bactericides, fillers and the like.

In a separate mixing step, the premix as described above may then be admixed with an effective amount of a crosslinking agent for the [inground] in situ crosslinking of the primer, primer-adhesive interface and the further crosslinking of the adhesive coating itself, in accordance with the teachings of the Jenkins patent. This crosslinking agent may be any of the per se known rubber crosslinkers, e.g. p-quinone dioxime, p-dinitrosobenzene, a phenolic resin, etc., the preferred being p-quinone dioxime. The amount of crosslinker so employed will vary in accordance with its speed and effectiveness and is accordingly not capable of precise quantitative definition. However, the selection of particular desired amounts will be readily apparent to those skilled in the art in the light of the present description. Accordingly, as used herein and in the appended claims, the term "effective amount" means the amount required to provide the desired inground crosslinking prior to the time in which creep and/or other stability problems of the pipewrap would otherwise occur. By way of further illustration, it has been found that on the order of from about 1.0% to about 3.0% by weight of p-quinone dioxime based upon the total weight of the rubber components of the dispersion is entirely satisfactory.

In the embodiment described above, the crosslinking agent required for the additional crosslinking is incorporated in the adhesive tape itself, following the teachings of the '231 patent. While preferred, it is not essential to do so. The only criticality is that the crosslinker and crosslinking activator be contained separately so as to preclude premature crosslinking prior to applying the tape to the primer-coated pipe. Thus, in lieu of having crosslinker in the adhesive and activator in the primer coating, it is visualized that the order may be reversed so that the activator is contained initially in the adhesive and the crosslinker in the primer. Alternatively, one or the other may be contained in a separate layer or element, e.g. a tie-coat to be applied over the primer, in which event the anti-corrosion coating for the metal pipe may be described as consisting of the adhesive tape adhering to the primer coating through an intermediate tie-coat containing one of the crosslinking and activator components, the other being contained in the adhesive or primer coatings, or both.

The primer mixture to be coated onto the pipe may be prepared in accordance with known procedures, e.g. as described in the aforementioned '231 patent. In general, it will comprise natural rubber and at least one tackifier resin dispersed in an organic solvent. In the preferred embodiment, as stated above, it will also contain the crosslinking activator, e.g. a metal oxide such as lead or zinc oxide.

The following examples shown by way of illustration and not by way of limitation the practice of this invention.

EXAMPLE 1

81.0 lbs. of virgin butyl rubber; 111.0 lbs. of reclaimed butyl rubber; 32.0 lbs. of Kalar 5263 (partially crosslinked virgin butyl rubber); 2.5 pounds of antioxidant, Agerite Stalite S (trademark of R. T. Vanderbilt Company for an octylated diphenylamino composition); 31.0 gms. of bacetericide, salicylanilide; and 70.0 lbs. of a filler, McNamee Clay (a Kaolin soft clay from R. T. Vanderbilt Company) were mixed for about 100 seconds in a Banbury Mixer (ram pressure 55 psi; rotor speed: 85 rpm; water coolant: 125° F.) 110.0 lbs. of additional McNamee Clay and 64.0 lbs. of Indopol H-100 (trademark of Amoco Chemicals for a polybutene tackifier) were then added and mixed for sixty seconds, after which, 86.0 pounds of Escorez 1102 (trademark of Exxon for an aliphatic hydrocarbon tackifier resin having a nominal softening point of 100° C. and an acid number of 1 or less) and 66 additional pounds of McNamee Clay were added and mixed for about seventy seconds to yield approximately 620.5 pounds of homogeneous dispersion, the premix for the adhesive coating. This premix was then withdrawn from the Banbury Mixer and mixed with about 3.0 pounds (about 1.3% by weight of the rubber blend) of p-quinone dioxime to provide the adhesive formulation. A layer of this formulation approximately 12 mils thick was then calendered onto a 13 mil polyethylene tape web backing material.

EXAMPLE 2

Example 1 was repeated, varying the amounts of the ingredients in the three Banbury mixing steps as follows:

| | | |
|---|---|---|
| I | Virgin Butyl Rubber | 74.0 lbs. |
| | Reclaimed Butyl Rubber | 106.0 lbs. |
| | Kalar 5263 | 32.0 lbs. |
| | Agerite Stalite S | 2.5 lbs. |
| | Salicylanilide | 31.0 gms. |
| | McNamee Clay | 70.0 lbs. |
| II | McNamee Clay | 104.0 lbs. |
| | Indopol H-100 | 61.0 lbs. |
| III | Escorez 1102 | 82.0 lbs. |
| | McNamee Clay | 60.0 lbs. |

EXAMPLE 3

Example 1 was repeated, changing the amount of Kalar 5263 to about 64 pounds.

EXAMPLE 4

Example 1 was repeated, changing the amount of p-quinone dioxime to about 2.2 lbs. (1.0% of the rubber blend).

EXAMPLE 5

Example 1 was repeated, changing the amount of p-quinone dioxime to about 6.6 pounds (3.0% by weight of rubbers).

EXAMPLE 6

A primer coating was prepared in accordance with the formulation described in the '231 patent, namely by mixing in a Nauta high intensity blender at 150° F. the following proportions of ingredients.

| | |
|---|---|
| Natural Rubber (Reclaim) | 2,270 gms. |
| Hydrocarbon Tackifier Resin (Zirex) | 1,906 gms. |
| Toluene | 1,089 gms. |
| Heptane | 16,798 gms. |
| Lead Dioxide (organo-titantia-treated) | 209 gms. |

EXAMPLE 7

Zinc oxide was substituted for the lead dioxide in Example 6. Although it was found to be an effective substitute, its reaction rate in catalyzing the in situ crosslinking was slower.

The primer-adhesive tape system of this invention may be employed as a protective coating in the same manner described in the aforementioned U.S. Pat. No. 4,472,231. To illustrate, the primer mixture is first applied to the surface of a metal pipe to be implanted inground. This may be done either in the factory or over-the-ditch. Prior to implanation, the adhesive tape is overlayered, typically in a helical wrap.

The protective coating thus applied has been found to give comparable satisfactory protection, e.g. against corrosion, and to exhibit comparable stability and resistance to creep to the protective coating system of the '231 patent. Specifically, systems prepared in accordance with the foregoing illustrative examples were found fully to meet the aforementioned shear requirement that after 48 hours conditioning at 85° C., the shear rate will not exceed $10^{-8}$ meters/second.

To recapitulate, however, the present invention is not directed to the task of improved protective coatings over those disclosed in the '231 patent. Accordingly, patentable novelty is not herein predicated upon any allegations of improved results.

Patentable novelty is instead predicated upon improvements in manufacture of a system in a commercially feasible manner which will give comparable satisfactory results.

Since certain changes may be made without departing from the scope of the invention herein described, it is intended that all matter contained in the foregoing descriptions, including the examples, shall be taken as illustrative and not in a limiting sense.

What is claimed is:

1. A method for applying a protective adhesive wrap to metal tubular articles comprising the steps of:
   (1) providing a rubber-based adhesive mix including a homogeneous blend of pre-crosslinked butyl rubber, virgin butyl rubber and a tackifier;
   (2) providing a rubber-based primer coating;
   (3) incorporating a rubber crosslinking agent in one of said adhesive mix or said primer coating, and a crosslinking activator in the other of said adhesive mix or primer coating, provided that when said crosslinking agent is incorporated in said adhesive mix, said incorporation is in a separate mixing step subsequent to providing said adhesive mix;
   (4) coating said adhesive mix containing one of said crosslinking agent or activator onto a backing material to provide an adhesive tape;
   (5) applying said primer coating to the outer surface of said tubular article; and
   (6) thereafter, overlapping said primer coated article with the adhesive surface of said tape.

2. A method as defined in claim 1 wherein said adhesive mix includes reclaimed butyl rubber.

3. A method as defined in claim 1 wherein said crosslinking agent is incorporated in said adhesive mixture.

4. A method as defined in claim 1 wherein said crosslinking agent comprises p-quinone dioxime.

5. A method as defined in claim 1 wherein said adhesive mix is provided by admixing said rubber blend and tackifier in a Banbury mixer.

6. A method as defined in claim 5 including the steps of removing said mix from said Banbury mixer and thereafter blending said crosslinking agent in said mix.

7. A method as defined in claim 1 wherein the percentage of crosslinking in said pre-crosslinked butyl rubber is from about 35 to about 75%.

8. A method as defined in claim 1 wherein the amount of pre-crosslinked butyl in said mix is from about 8 to about 48% by weight of the total rubber in said mix.

9. A method as defined in claim 7 wherein the percentage of crosslinking is about 55% and said pre-crosslinked butyl is from about 13 to about 30% by weight of the total amount of rubber in said mix.

10. A method as defined in claim 1 wherein said tape backing material comprises a polyolefin.

11. A method for applying a protective adhesive wrap to metal pipes comprising the steps of:
    (1) admixing (a) a partially crosslinked butyl rubber, the percentage of crosslinking being from about 35 to about 75%; (b) virgin butyl rubber alone or in combination with reclaimed butyl rubber; and (c) a tackifier to provide a homogeneous adhesive mix;
    (2) providing a rubber-based primer coating;
    (3) incorporating a rubber crosslinking agent in one of said adhesive mix or said primer coating, and a crosslinking activator in the other of said adhesive mix or said primer coating, provided that when said crosslinking agent is incorporated in said adhesive mix, said incorporation is in a separate mixing step subsequent to providing said adhesive mix;
    (4) coating said adhesive mix containing one of said crosslinking agent or said activator onto a polyolefin backing material to provide an adhesive tape;
    (5) applying said primer coating to the outer surface of said metal pipe; and
    (6) thereafter, wrapping said adhesive tape around said primer-coated pipe.

12. A method as defined in claim 11 wherein said crosslinking agent is incorporated in said adhesive mix.

13. A method as defined in claim 12 wherein said crosslinking agent is p-quinone dioxime and said activator is lead oxide or zinc oxide.

14. A method as defined in claim 13 wherein said pre-crosslinked butyl rubber comprises from about 8 to about 48% by weight of the rubber in said mix.

15. A system for providing a protective adhesive wrap for tubular metal articles comprising:
    (1) a rubber-based primer coating adapted for adhering to the surface of said metal article;
    (2) a rubber-based adhesive tape adapted to be wrapped around and adhered to said primer-coated metal article, said adhesive tape comprising a backing material containing an adhesive coating including a homogeneous blend of a partially pre-crosslinked butyl rubber, virgin butyl rubber and a tackifier, said system further including a crosslinking agent and a crosslinking activator adapted for providing in situ crosslinking of said primer coating, said adhesive coating and at the interface between said adhesive and primer coating subsequent to wrapping said adhesive tape around said primer-coated pipe.

16. A system as defined in claim 15 wherein said adhesive blend further includes reclaimed butyl rubber.

17. A system as defined in claim 16 wherein said crosslinking agent is contained in said adhesive coating.

18. A system as defined in claim 17 wherein said crosslinking agent is p-quinone dioxime.

19. A system as defined in claim 18 wherein the percentage of crosslinking in said partially pre-crosslinked butyl rubber is from about 35 to about 75%.

20. A system as defined in claim 19 wherein the amount of pre-crosslinked butyl in said adhesive coating is from about 8 to about 48% by weight of the total rubber blend in said coating.

21. A system as defined in claim 20 wherein the amount of said pre-crosslinked butyl rubber is from about 13 to about 30%.

22. A system as defined in claim 21 wherein said primer coating comprises a blend of natural rubber tackifier and said activator.

23. A system as defined in claim 22 wherein said activator is lead oxide or zinc oxide.

* * * * *